United States Patent
Su et al.

(10) Patent No.: US 12,140,013 B1
(45) Date of Patent: Nov. 12, 2024

(54) SEALING QUALITY DETECTION DEVICE AND SEALING QUALITY EVALUATING METHOD FOR GAS EXTRACTION BOREHOLES

(71) Applicant: CHINA COAL TECHNOLOGY & ENGINEERING GROUP SHENYANG ENGINEERING COMPANY, Shenyang (CN)

(72) Inventors: Weiwei Su, Shenyang (CN); Yujin Qin, Shenyang (CN); Rui Zhou, Shenyang (CN); Zhongyu Zheng, Shenyang (CN); Jie Li, Shenyang (CN); Fuchao Tian, Shenyang (CN); Yongming Zou, Shenyang (CN); Yang Xu, Shenyang (CN); Xunqiang Yan, Shenyang (CN); Weili Sun, Shenyang (CN); Jinkui Ma, Shenyang (CN)

(73) Assignee: CHINA COAL TECHNOLOGY & ENGINEERING GROUP SHENYANG ENGINEERING COMPANY, Shenyang (CN)

(*) Notice: Subject to any disclaimer, the term of this patent is extended or adjusted under 35 U.S.C. 154(b) by 0 days.

(21) Appl. No.: 18/547,849

(22) PCT Filed: Mar. 28, 2023

(86) PCT No.: PCT/CN2023/084337
§ 371 (c)(1),
(2) Date: Aug. 24, 2023

(87) PCT Pub. No.: WO2023/236631
PCT Pub. Date: Dec. 14, 2023

(30) Foreign Application Priority Data

Jun. 9, 2022 (CN) .......................... 202210643700.7

(51) Int. Cl.
*E21B 47/005* (2012.01)
*G01M 13/005* (2019.01)

(52) U.S. Cl.
CPC ......... *E21B 47/005* (2020.05); *G01M 13/005* (2013.01)

(58) Field of Classification Search
CPC ..... E21B 33/02; E21B 47/005; G01M 13/005
See application file for complete search history.

(56) References Cited

U.S. PATENT DOCUMENTS 5,462,120 A * 10/1995 Gondouin ............... E21B 7/061
166/380
6,865,933 B1 3/2005 Einarson
(Continued)

FOREIGN PATENT DOCUMENTS

| CN | 102680187 A | 9/2012 |
|---|---|---|
| CN | 102900428 B | 2/2015 |

(Continued)

OTHER PUBLICATIONS

Yang Hongmin et al., "Sealing quality detection and quantitative evaluation method for gas extraction boreholes", Journal of China Coal Society, vol. 44, No. S1, Aug. 31, 2019, pp. 164-170.

*Primary Examiner* — Shane Bomar
(74) *Attorney, Agent, or Firm* — MUNCY, GEISSLER, OLDS & LOWE, P.C.

(57) ABSTRACT

A sealing quality detection device for gas extraction boreholes includes a detection host, a detection pipe, a sealing element, and a three-way pipe. A plurality of air inlets and a plurality of exhaust ports are formed above the detection host, a negative pressure injector is arranged in the detection host, a quick joint and a control switch are also arranged on the detection host, the quick joint is used to be connected with an underground wind pipe, the underground wind pipe is connected to an underground compressed air tube, and the (Continued)

control switch is used for starting and switching off the negative pressure injector in the detection host. A sealing quality evaluating method for gas extraction boreholes is provided.

6 Claims, 6 Drawing Sheets

(56) References Cited

U.S. PATENT DOCUMENTS

| | | | | |
|---|---|---|---|---|
| 2010/0284749 A1* | 11/2010 | Capron | ............... | C12M 23/14 |
| | | | | 435/41 |
| 2011/0187556 A1* | 8/2011 | Roddy | ............... | G01V 15/00 |
| | | | | 340/853.3 |
| 2011/0199228 A1* | 8/2011 | Roddy | ............... | E21B 47/01 |
| | | | | 340/856.4 |
| 2013/0197810 A1* | 8/2013 | Haas | ............... | E21B 47/113 |
| | | | | 702/6 |
| 2013/0266380 A1* | 10/2013 | Capron | ............... | C12M 23/14 |
| | | | | 405/184.4 |
| 2023/0109552 A1* | 4/2023 | Heller | ............... | E21B 49/08 |
| | | | | 702/12 |
| 2023/0152196 A1* | 5/2023 | Hou | ............... | G01M 3/26 |
| | | | | 73/1.57 |

FOREIGN PATENT DOCUMENTS

| | | |
|---|---|---|
| CN | 106769270 A | 5/2017 |
| CN | 108956023 A | 12/2018 |
| CN | 110424948 A | 11/2019 |
| CN | 110985106 A | 4/2020 |
| CN | 212228515 U | 12/2020 |
| CN | 113107466 A | 7/2021 |
| CN | 113605963 A | 11/2021 |
| CN | 215830490 U | 2/2022 |
| CN | 114183136 A | 3/2022 |
| CN | 115012909 A | 9/2022 |
| GB | 1277364 A | 6/1972 |
| JP | H0665847 U | 9/1994 |
| JP | 2007017206 A | 1/2007 |

* cited by examiner

SEALING QUALITY DETECTION DEVICE AND SEALING QUALITY EVALUATING METHOD FOR GAS EXTRACTION BOREHOLES

BACKGROUND OF THE INVENTION

1. Field of the Invention

The invention relates to the technical field of gas extraction, in particular to a sealing quality detection device and sealing quality evaluating method for gas extraction boreholes.

2. The Prior Arts

A gas extraction technology, as one of fundamental control measures for coal mine gas problems, has been widely applied in many coal mines at home and abroad. The sealing quality of gas extraction boreholes is one of the key factors to ensure gas extraction effects. Therefore, in order to ensure the extraction effects of the gas extraction boreholes, it is necessary to ensure the sealing quality of the gas extraction boreholes. The sealing quality of the gas extraction boreholes usually refers to the extent to which the sealing section can effectively resist air leakage from the hole wall, surrounding rocks, and other places into the boreholes, as well as timeliness and stability. The factors that affect the sealing quality are mainly related to the retention of the boreholes, the surrounding rocks, sealing materials, sealing processes, personnel operations and the like. At present, the sealing quality detection method for gas extraction boreholes comprises: (1) determining the sealing quality and air leakage positions of the gas extraction boreholes by detecting the concentration of extracted gas at different positions in the boreholes (patent number CN102900428B), the device can detect and determine the air leakage positions in the boreholes under negative pressure extraction conditions, however, it is necessary to continuously adjust the length of the detection pipe so as to detect the gas concentration at different positions in the boreholes, and the detection time between the first detection point and the last detection point is relatively long, which can seriously affect the detection effects and cause misjudgment of the sealing quality of the gas extraction boreholes; (2) air is pressed into the gas extraction boreholes to determine the sealing quality by observing internal pressure changes in the boreholes (patent publication number CN102680187A), the judgment method can only roughly classify the sealing quality level of the extraction boreholes based on the pressure changes, and cannot accurately analyze the air leakage positions; (3) water is injected into the boreholes and an ultrasonic detector is used to detect the sealing quality (patent publication number CN110985106A), the method is complex to operate, the resolution of ultrasonic reflection signals is low, and many influencing factors exist; (4) the sealing quality of gas extraction boreholes is determined based on gas concentration changes and the use of tracer gas (patent publication number CN113107466A), the method is complex to operate and high in cost, and can only determine whether there is an overall air leakage in the sealing section and cannot accurately determine the air leakage positions; (5) the extraction concentration, extraction purity, attenuation coefficients and abnormal phenomena of the extraction boreholes are classified, and the sealing quality of the gas extraction boreholes is comprehensively evaluated according to the weight of each index (patent publication number CN110424948A), and the method has very limited accuracy, and there are many factors that can affect the on-site extraction, such as extraction negative pressure, and extraction pipe diameters. Therefore, a device and method being easy to operate, and high in accuracy, and capable of quantitatively evaluating the sealing quality of gas extraction boreholes are needed.

SUMMARY OF THE INVENTION

In order to solve the technical problem, the invention aims to provide a sealing quality detection device and sealing quality evaluating method for gas extraction boreholes.

In order to realize the purpose, the sealing quality detection device for gas extraction boreholes comprises a detection host, a detection pipe, a sealing element, and a three-way pipe; wherein a plurality of air inlets and a plurality of exhaust ports are formed above the detection host, a negative pressure injector is arranged in the detection host, a quick joint and a control switch are also arranged on the detection host, the quick joint is used to be connected with an underground wind pipe, the underground wind pipe is connected to an underground compressed air tube, and the control switch is used for starting and switching off the negative pressure injector in the detection host; wherein a second interface of the three-way pipe is connected with an extraction pipe, the extraction pipe is arranged in each gas extraction borehole, a third interface of the three-way pipe is connected with an extraction tube, one end of the detection pipe is connected with the air inlets of the detection host, another end of the detection pipe penetrates through the three-way pipe from a first interface of the three-way pipe and penetrates out of the second interface of the three-way pipe to be arranged in the extraction pipe and a corresponding gas extraction borehole, and the sealing element is arranged at a connection part between the detection pipe and the first interface of the three-way pipe, and is used for sealing a gap between the detection pipe and the first interface of the three-way pipe; and wherein the detection pipe comprises a hollow pipe body, a plurality of air-suction ports, a support frame and a plurality of air-suction pipes, wherein the plurality of air-suction ports which are formed in a spacing manner are formed in the hollow pipe body, the support frame is arranged in the hollow pipe body, a plurality of through holes allowing the air-suction pipes to penetrate through are formed in the support frame, each through hole can allow one air-suction pipe to penetrate through, one ends of the plurality of the air-suction pipes penetrate through the through holes in the support frame to be in one-to-one connection with the air-suction ports in the hollow pipe body, one section of another end of each air-suction pipe is placed outside the hollow pipe body, and while in use, the air-suction pipes are in one-to-one connection with the air inlets in the detection host.

Further, twelve air-suction ports are formed, and twelve air-suction pipes are arranged.

Further, the hollow pipe body and the support frame are made of a polyethylene-aluminum material, and the air-suction pipes are made of a flame-retardant PE material.

Further, a plurality of waterproof devices are mounted on the detection pipe, are sleeved on the hollow pipe body and are placed behind each air-suction port.

Further, each waterproof device comprises a sleeve body, a first screw nut and a second screw nut, wherein the sleeve body comprises a first hollow cylindrical section, while a second hollow cylindrical section and a third hollow cylindrical section are respectively arranged at two ends of the first hollow cylindrical section, a first external thread and a first square gear are arranged on an outer circumference of the second hollow cylindrical section, a second external thread and a second square gear are arranged on an outer circumference of the third hollow cylindrical section, the sleeve body sleeves outside the hollow pipe body, the first screw nut and the second screw nut are respectively mounted on the second hollow cylindrical section and the third hollow cylindrical section, and the first screw nut and the second screw nut are respectively and tightly screwed at the first external thread and the second external thread to fix the sleeve body to an outer part of the hollow pipe body.

The invention further provides a sealing quality evaluating method for gas extraction boreholes, adopting the sealing quality detection device for gas extraction boreholes, and the method comprises the following steps:

Step 1, investigating a depth $L_1$ of an actual sealing section of each gas extraction borehole, a sealing method, and a total length $L_2$ of the extraction pipe used in each gas extraction borehole, detecting front and rear parts of connection parts between the extraction pipes, an inner part of a width of a loose circle in a roadway, and other positions where air leakage may occur so as to determine a quantity and positions of detection points to be detected, and recording the detection points along a gas flow direction as $JC_1, JC_2, \ldots, JC_n$;

Step 2, detecting an extraction gas mixing quantity Q in the gas extraction boreholes that need to be detected by using a gas flow detection device;

Step 3, assembling the sealing quality detection device for gas extraction boreholes: firstly, connecting the second interface and the third interface of the three-way pipe with the extraction pipes and the extraction tube respectively, then according to the quantity and the positions of the detection points determined in Step 1, reserving the air-suction ports for detection of corresponding positions and quantities on the hollow pipe body of the detection pipe, sealing the other air-suction ports, marking and sealing the air-suction pipes connected with the air-suction ports, during detection, not connecting the air-suction pipes with the air inlets, at the same time, mounting the waterproof devices beside used air-suction ports for detection, rapidly placing the detection pipe with the waterproof device mounted in each gas extraction borehole from the first interface of the three-way pipe, mounting the sealing element at the connecting part between the first interface of the three-way pipe and the detection pipe, at this time, the gas extraction boreholes are in a normal extraction status, sequentially connecting another ends of the air-suction pipes for detection to the air-suction ports of the detection host, and after connection is finished, using the underground wind pipe for connecting the detection host and the underground compressed air tube to provide power for the negative pressure injector in the detection host;

Step 4, after assembly is finished, starting the control switch to perform pretest experiment on the sealing quality detection device for gas extraction boreholes, and under normal circumstances, and under an action of the negative pressure injector, simultaneously working all the air-suction ports and the exhaust ports on the detection host;

Step 5, after the experiment is finished, switching the control switch off, connecting each exhaust port in the detection host with a rubber bladder for collecting gas, then starting the control switch, enabling gas in the gas extraction boreholes to enter each air-suction pipe in the detection pipe at the same time through the air-suction ports in the detection pipe, and then finally to enter the rubber bladders through the exhaust ports corresponding to the air inlets in the detection host, after the pre-detected gas is collected in the rubber bladders, switching the control switch off, then, using an underground gas detection equipment for determining a gas concentration in the rubber bladders, or bringing the rubber bladders to a ground to determine the gas concentration by a chromatographic instrument, so as to obtain gas concentrations $ND_1, ND_2, \ldots, ND_n$ at detection points;

Step 6, repeating Step 5 to cycle until the sealing quality of all the gas extraction boreholes has been determined; and Step 7, evaluating the sealing quality of each gas extraction borehole by using a total air leakage rate K of a single gas extraction borehole.

Further, Step 7 further comprises the following steps for evaluating the sealing quality of each gas extraction borehole:

According to the extraction gas mixing quantity Q in the gas extraction boreholes obtained from Step 2 and the $ND_1$, $ND_2, \ldots, ND_n$ obtained from Step 5, based on a principle that pure gas contents are the same in all parts of each gas extraction borehole, then the pure gas contents CL in all parts of each gas extraction borehole is $Q \times ND_n$, based on $Q_i = CL/ND_i (i=1, 2, \ldots, n)$, an extraction gas mixing quantity $Q_i$ at each detection point is calculated, a total air leakage quantity of the gas extraction boreholes is $Q_L = Q - Q_1 = Q_n - Q_1$, and a total air leakage rate of the gas extraction boreholes is $$K = \frac{Q_n - Q_1}{Q} \times 100\%$$

or $$K = \frac{Q - Q_1}{Q} \times 100\%.$$

Further, the sealing quality evaluating method for gas extraction boreholes further comprises: Step 8 is performed after Step 7, and Step 8 comprises the following steps:

According to a total air leakage rate K of the gas extraction boreholes, a sealing quality level of the gas extraction boreholes is classified, corresponding treatment suggestions are proposed, and the sealing quality level and recommended treatment measures are shown as Table 1:

TABLE 1

Sealing quality level and recommended treatment measures

| Total air leakage rate K(%) of gas extraction boreholes | Sealing quality level | Recommended treatment measures |
|---|---|---|
| 0 | Tight sealing | Normal use |
| 0-10 | Minor air leakage | Control negative pressure |
| 10-50 | Excessive air leakage | Secondary sealing |
| ≥50 | Severe air leakage | Removal and isolation |

Further, Step 7 further comprises the following steps: evaluating the sealing quality of different borehole groups, wherein when each borehole group consists of a plurality of gas extraction boreholes, the sealing quality is evaluated by a proportion λ of air leakage gas extraction boreholes and an average air leakage rate η of the borehole group;

Wherein the proportion λ of air leakage gas extraction boreholes is a ratio of a number m of air leakage gas extraction boreholes to a total number N of entire evaluated gas extraction boreholes, $$\lambda = \frac{m}{N} \times 100\%;$$

and

Wherein the average air leakage rate η is a ratio of a sum of a total air leakage rate K of air leakage gas extraction boreholes in entire evaluated boreholes to a number m of air leakage gas extraction boreholes, $$\eta = \frac{\sum_{i=1}^{m} K_i}{m}.$$

Compared with the prior art, the sealing quality detection device for gas extraction boreholes has the beneficial effects that The sealing quality detection device for gas extraction boreholes can be used under the normal extraction condition of the gas extraction boreholes, can perform gas collection on the multiple detection points (the number n of detection points is smaller than or equal to twelve) in the gas extraction boreholes, and can effectively prevent the problem that gas concentration changes in the gas extraction boreholes caused by a time difference ultimately result in the detection results deviating from reality; at the same time, the waterproof devices of the sealing quality detection device for gas extraction boreholes can effectively prevent small streams of water in the gas extraction boreholes from entering the sealing quality detection device for gas extraction boreholes; in addition, the detection pipe of the sealing quality detection device for gas extraction boreholes is strong in plasticity, has certain strength, and is convenient to carry and use; and in addition, the power of the sealing quality detection device for gas extraction boreholes can be provided by the underground compressed air tube, without electronic equipment, so that the sealing quality detection device for gas extraction boreholes is safe and reliable. The sealing quality evaluating method of the present invention can quantitatively evaluate the sealing quality of a single gas extraction borehole by calculating the air leakage rate, and compare the overall sealing quality of the borehole groups, thereby achieving comparison of sealing quality between different sealing methods. The sealing quality detection device and the sealing quality detection method for gas extraction boreholes have the advantages of being simple to operate, and high in accuracy, and capable of quantitatively evaluating the sealing quality of the gas extraction boreholes.

Figure 1:
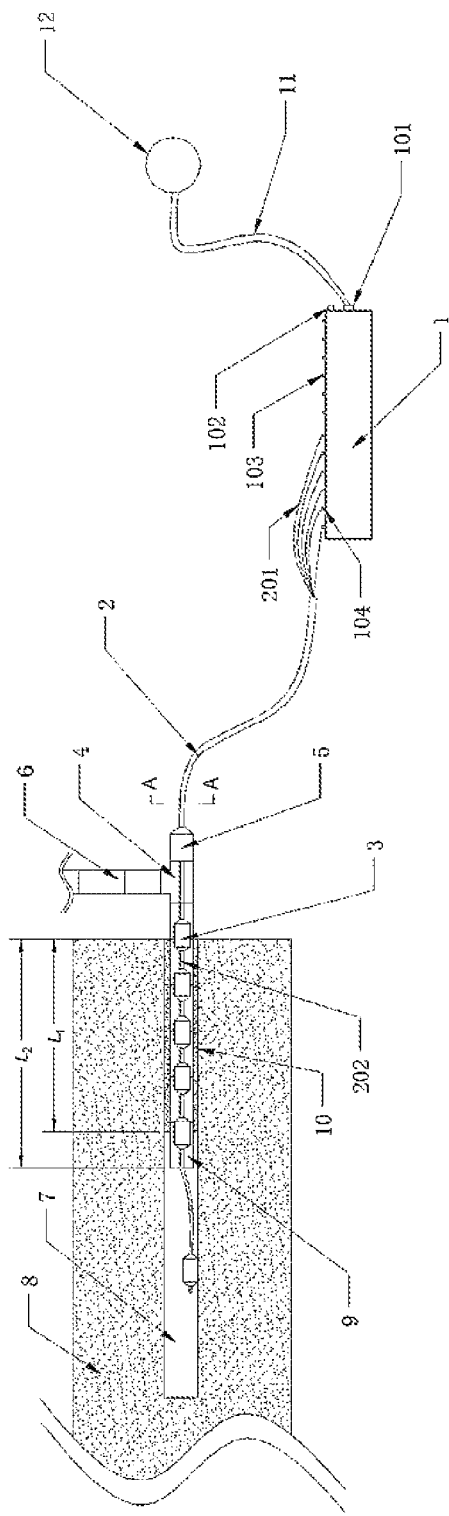
FIG. 1 is a schematic diagram of the structure of a sealing quality detection device for gas extraction boreholes in the embodiment of the invention.

1: detection host; 101: quick joint; 102: control switch; 103: exhaust port; 104: air inlet; 2: detection pipe; 201: air-suction pipe; 202: air-suction port; 203: support frame; 2031: through hole; 204: hollow pipe body; 3: waterproof device; 301: sleeve body; 3011: first hollow cylindrical section; 3012: second hollow cylindrical section; 3013: third hollow cylindrical section; 3014: first external thread; 3015: first square gear; 3016: second external thread; 3017: second square gear; 302: first screw nut; 303: second screw nut; 4: three-way pipe; 5: sealing element; 6: extraction tube; 7: gas extraction borehole; 8: coal seam; 9: extraction pipe; 10: sealing material; 11: underground wind pipe; 12: underground compressed air tube; 13: Pitot pipe; 14: U-shaped differential pressure gauge; 15: elbow; and 16: hose.

DETAILED DESCRIPTION OF THE PREFERRED EMBODIMENT

The technical solutions in the embodiments of the present invention will be described clearly and completely hereinafter with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Gas extraction boreholes 7 are formed in a coal seam 8, after construction is finished, an extraction pipe 9 is placed in the gas extraction boreholes 7, then grouting is performed for sealing, and a sealing material 10 is used for sealing a gap between the extraction pipe 9 and the gas extraction boreholes 7. A sealing quality detection device and sealing quality evaluating method for gas extraction boreholes of the present invention achieve the detection and evaluation of the sealing quality of the gas extraction boreholes 7 in the coal seam 8.

Embodiment I

Please refer to FIGS. 1-5, a sealing quality detection device for gas extraction boreholes comprises a detection host 1, a detection pipe 2, a sealing element 5, and a three-way pipe 4. A plurality of air inlets 104 and a plurality of exhaust ports 103 are formed above the detection host 1 (in the embodiment, 12 air inlets 104 and 12 exhaust ports 103 are formed in total), and the arrangement and distribution of the air inlets 104 and the exhaust ports 103 can be adjusted according to the actual shape of the detection host 1, a negative pressure injector (not shown) is arranged in the detection host 1, a quick joint 101 and a control switch 102 are also arranged on the detection host 1, the quick joint 101 is used to be connected with an underground wind pipe 11, the underground wind pipe 11 is connected to an underground compressed air tube 12, and the control switch 102 is used for starting and switching off the negative pressure injector in the detection host 1. A second interface of the three-way pipe 4 is connected with an extraction pipe 9, the extraction pipe 9 is arranged in each gas extraction borehole 7, a third interface of the three-way pipe 4 is connected with an extraction tube 6, one end of the detection pipe 2 is connected with the air inlets of the detection host 1, another end of the detection pipe 2 penetrates through the three-way pipe 4 from a first interface of the three-way pipe 4 and penetrates out of the second interface of the three-way pipe 4 to be arranged in the extraction pipe 9 and a corresponding gas extraction borehole 7, and the sealing element 5 is arranged at a connection part between the detection pipe 2 and the first interface of the three-way pipe 4, and is used for sealing a gap between the detection pipe 2 and the first interface of the three-way pipe 4 so as to prevent the condition that air in the roadway enters the gas extraction boreholes 7 to influence the detection results. A diameter of the first interface connected with the sealing element 5 in the three-way pipe 4 is kept to be a constant value, and usually φ 50 mm, a diameter of the second interface of the three-way pipe 4 and a diameter of the third interface of the three-way pipe 4 can be adjusted according to actual diameters of the extraction tube 6 and the extraction pipe 9 which are used on site, and are usually φ 50 mm. The three-way pipe 4 is a flame-retardant PVC or PE pipe fitting. The structure of the sealing element 5 is similar to that of waterproof devices 3, the sealing element 5 and the waterproof devices 3 are all hollow pipes, one end of the sealing element 5 can be directly connected with the first interface of the three-way pipe 4, and another end of the sealing element 5 can also be tightly connected with the detection pipe 2 by tightly screwing screw nuts (not shown) and squeezing square gears (not shown).

Figure 3:
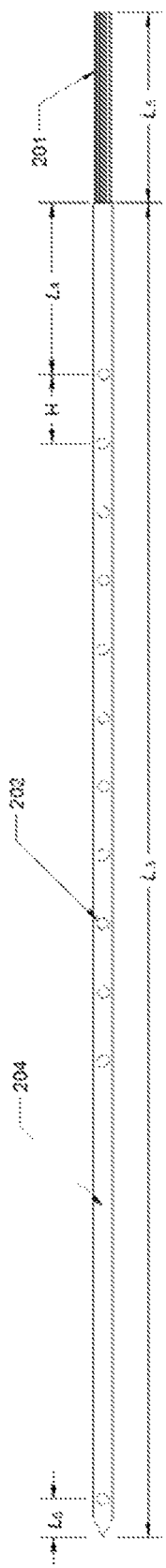
FIG. 3 is a schematic diagram of distribution of air-suction ports in the detection pipe of the sealing quality detection device for gas extraction boreholes in the embodiment of the invention.
Figure 4:
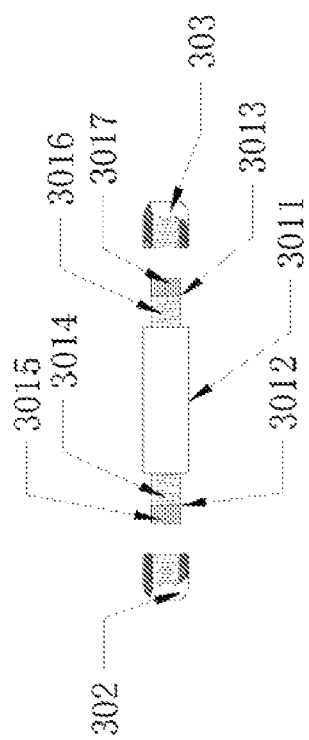
FIG. 4 is a schematic diagram of the structure of waterproof devices of the sealing quality detection device for gas extraction boreholes in the embodiment of the invention.
Figure 5:
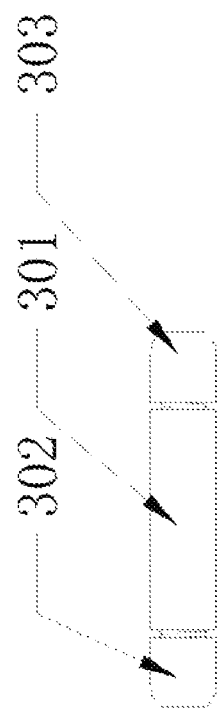
FIG. 5 is a schematic diagram of an overall exterior structure of the waterproof devices of the sealing quality detection device for gas extraction boreholes in the embodiment of the invention.

Referring to FIG. 3, the detection pipe 2 comprises a hollow pipe body 204, a plurality of air-suction ports 202, a support frame 203 and a plurality of air-suction pipes 201. The plurality of air-suction ports 202 which are formed in a spacing manner are formed in the hollow pipe body 204, the hollow pipe body 204 is in the shape of a hollow cylinder, and an end head of a front end of the hollow pipe body 204 is designed to be conical so as to effectively reduce propulsion resistance when the hollow pipe body 204 advances within the gas extraction boreholes 7. The support frame 203 is arranged in the hollow pipe body 204, a plurality of through holes 2031 allowing the air-suction pipes 201 to penetrate through are formed in the support frame 203, and each through hole 2031 can allow one air-suction pipe 201 to penetrate through. One ends of the plurality of the air-suction pipes 201 penetrate through the through holes 2031 in the support frame 203 to be in one-to-one connection with the air-suction ports 202 in the hollow pipe body 204, one section of another end of each air-suction pipe 201 is placed outside the hollow pipe body 204, and while in use, the air-suction pipes 201 are in one-to-one connection with the air inlets 104 in the detection host 1. Twelve air-suction ports 202 are formed, and twelve air-suction pipes 201 are arranged. Lengths of the twelve air-suction pipes 201 in the detection pipe 2 are different, considering that a sealing length of the current gas extraction boreholes 7 is generally between 10-20 m, a total length $L_3$ of the hollow pipe body 204 of the detection pipe 2 provided in the embodiment is 35 m, and a length $L_5$ of exposed parts of all air-suction pipes 201 at a rear end of the hollow pipe body 204 is 5 m. In the embodiment, twelve air-suction ports 202 are distributed as follows: one of the air-suction ports 202 is formed at a distance $L_6$ of 1 m between the front end of the hollow pipe body 204 and the front end of the conical end head of the front end of the hollow pipe body 204, the other eleven air-suction ports 202 are evenly distributed on the hollow pipe body 204 with a spacing H of 1.8 m., and a distance $L_4$ between one of the air-suction ports 202 at the rear end of the hollow pipe body 204 and an end surface of the rear end of the hollow pipe body 204 is 4.5 m.

The hollow pipe body 204 and the support frame 203 are made of a polyethylene-aluminum material which is easy to bend, light in weight, strong in corrosion resistance, and flame-retardant, and the air-suction pipes 201 are made of a flame-retardant PE material which is easy to bend, light in weight, and not liable to collapse under negative pressure.

Figure 2:
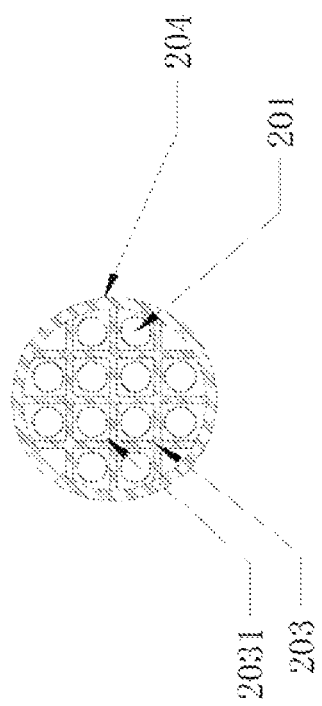
FIG. 2 is a schematic diagram of a cross-sectional structure at A-A in FIG. 1.

Referring to FIG. 2, the support frame 203 of the present invention comprises a plurality of crossbeams and a plurality of longitudinal beams, which are vertically fixed to form a plurality of through holes 2031 allowing the air-suction pipes 201 to pass through, and ends of the plurality of the crossbeams and ends of the plurality of the longitudinal beams are respectively fixed on an inner wall surface of the hollow pipe body 204 of the detection pipe 2. A length of the support frame 203 is a distance from the rear end of the hollow pipe body 204 to a center of the first air-suction port 202 in the front end of the hollow pipe body 204, which is $L_3-L_6$. In the embodiment, $L_3-L_6=(35-1)$ m=34 m.

A plurality of waterproof devices 3 are mounted on the detection pipe 2, are sleeved on the hollow pipe body 204 and are placed behind each air-suction port 202. The waterproof devices 3 are arranged, so that a position of each air-suction port 202 can be raised so as to prevent the air-suction ports 202 from being in direct contact with water, and prevent the condition that water in the gas extraction boreholes 7 is sucked into the air-suction pipes 201 to cause detection errors or damage instruments.

Each waterproof device 3 comprises a sleeve body 301, a first screw nut 302 and a second screw nut 303. The sleeve body 301 comprises a first hollow cylindrical section 3011, while a second hollow cylindrical section 3012 and a third hollow cylindrical section 3013 are respectively arranged at two ends of the first hollow cylindrical section 3011. A first external thread 3014 and a first square gear 3015 are arranged on an outer circumference of the second hollow cylindrical section 3012, a second external thread 3016 and a second square gear 3017 are arranged on an outer circumference of the third hollow cylindrical section 3013. The sleeve body 301 sleeves outside the hollow pipe body 204. The first screw nut 302 and the second screw nut 303 are respectively mounted on the second hollow cylindrical section 3012 and the third hollow cylindrical section 3013, and the first screw nut 302 and the second screw nut 303 are respectively screwed at the first external thread 3014 and the second external thread 3016. During the tightly screwing process, the first square gear 3015 and the second square gear 3017 are continuously squeezed to tightly fix the sleeve body 301 on an outer part of the hollow pipe body 204. The sleeve body 301, the first screw nut 302, and second screw nut 303 are all made of a flame-retardant plastic material.

The negative pressure injector in the detection host 1 of the present invention can simultaneously generate negative pressure and suction effects on the air-suction pipes 201 connected with the twelve air inlets 104. The functions of the air inlets 104 and the exhaust ports 103 are to suck gas from the gas extraction boreholes 7 into the detection host 1 by connecting the air-suction pipes 201 to the air inlets 104, and discharge the gas to an external part of the detection host 1 or a gas collection device (not shown) through a corresponding exhaust port 103. The function of the quick joint 101 is to be quickly connected with the underground wind pipe 11 and convert positive pressure wind energy into power of the negative pressure injector by an internal device of the detection host 1, for use in an operation of the negative pressure injector. The function of the control switch 102 is to start and switch off the negative pressure injector in the detection host 1. The main function of the detection pipe 2 is to extend into the gas extraction boreholes 7 to provide a flow channel for collecting gas in the gas extraction boreholes.

Embodiment II

A sealing quality evaluating method for gas extraction boreholes, adopting the sealing quality detection device for gas extraction boreholes in embodiment I, comprises the following steps:

Step 1, investigating a depth $L_1$ of an actual sealing section of each gas extraction borehole 7, a sealing method, and a total length $L_2$ of the extraction pipe 9 used in each gas extraction borehole 7, detecting front and rear parts of connection parts between the extraction pipes 9, an inner part of a width of a loose circle in a roadway, and other positions where air leakage may occur so as to determine a quantity and positions of detection points to be detected (a number n of detection points is smaller than or equal to twelve), and recording the detection points along a gas flow direction as $JC_1, JC_2, \ldots, JC_n$.

Step 2, detecting an extraction gas mixing quantity Q in the gas extraction boreholes 7 that need to be detected by using a gas flow detection device.

Figure 6:
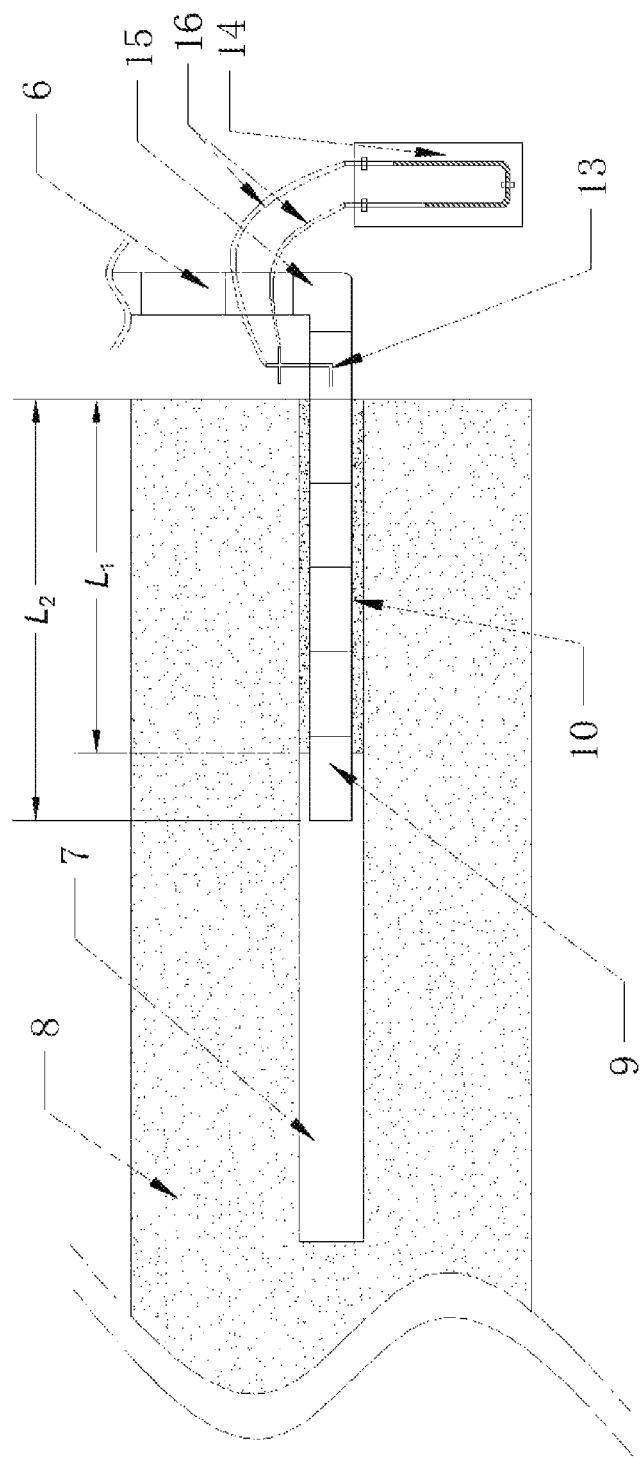
FIG. 6 is the schematic diagram that a Pitot pipe is used for determining the extraction gas mixing quantity of extraction boreholes in the sealing quality evaluating method for gas extraction boreholes in the embodiment of the invention.

A hole plate, relevant detectors or a Pitot pipe 13 can be selected for the detection method to detect the extraction gas mixing quantity Q. Referring to FIG. 6, the detection of the Pitot pipe 13 is taken as an example. During the detection, a detection end of the Pitot pipe 13 is put into the extraction pipe 9 through a reserved detection hole in the extraction pipe 9 (located at an orifice of the gas extraction boreholes 7). The extraction pipe 9 is connected with the extraction tube 6 through an elbow 15, and a connection port at a tail of the Pitot pipe 13 is connected with a U-shaped differential pressure gauge 14 through hoses 16 to maintain the extraction status, a differential pressure $\Delta h$ and a velocity pressure $H_v$ displayed by the U-shaped differential pressure gauge 14 (a handheld end of the Pitot pipe 13 is connected with the U-shaped differential pressure gauge 14 through the two hoses 16. When testing, the two hoses 16 are connected with the Pitot pipe 13, the pressure difference $\Delta h$ is detected. When the hose 16 on a right side of the handheld end of the Pitot pipe 13 is disconnected, both the right side of the handheld end of the Pitot pipe 13 and the right side of the U-shaped differential pressure gauge 14 are connected with the atmosphere. Only the hose 16 on a left side of the handheld end of the Pitot pipe 13 is connected with a left side of the U-shaped differential pressure gauge 14. At this time, a detection value is the velocity pressure value $H_v$), and the extraction gas mixing quantity Q in the gas extraction boreholes 7 is calculated according to the following formula:

$$Q = K_p \times D^2 \times \sqrt{\Delta h} \times Y.$$

In the formula, $K_p$ is a flow coefficient of the Pitot pipe 13, $Pa^{-0.5}$ r m/min; Y is a function of a maximum Reynolds number $R\infty$ at a center of the extraction pipe 9, and the value can be referred to Table 2; and D is a diameter of the extraction pipe 9, m.

$$R_\infty = \frac{vD}{\mu}.$$

In the formula, D is a diameter of the extraction pipe 9, m; $\mu$ is a gas motion viscosity coefficient, which can be taken as $1.51 \times 10^{-5}$ m²/s; v is a flow velocity at a center point in a tube of the extraction pipe 9, m/s, and v can be obtained from the following formula:

$$v = \sqrt{\frac{2H_v}{\rho}}.$$

In the formula, $\rho$ is a density of the gas, kg/m³; and $H_v$ is a velocity pressure value at a center point of the extraction pipe 9, Pa.

TABLE 2

Relation between maximum Reynolds number $R\infty$ and Y value at the center of gas extraction pipe

| $R\infty$ | ≤4500 | 10000 | 20000 | 40000 | 80000 | 200000 | 400000 |
|---|---|---|---|---|---|---|---|
| Y | 0.50 | 0.79 | 0.81 | 0.83 | 0.85 | 0.87 | 0.89 |

After the differential pressure value $\Delta h$ is determined, the Pitot pipe 13 and the U-shaped differential pressure gauge 14 are recovered, the reserved detection hole in the extraction pipe 9 is closed, the elbow 15 is removed from the extraction pipe 9 and the extraction tube 6, and connection of the sealing quality detection device for gas extraction boreholes is started.

Step 3, assembling the sealing quality detection device for gas extraction boreholes: firstly, connecting the second interface and the third interface of the three-way pipe 4 with the extraction pipes 9 and the extraction tube 6 respectively, then according to the quantity and the positions of the detection points determined in Step 1, reserving the air-suction ports 202 for detection of corresponding positions and quantities on the hollow pipe body 204 of the detection pipe 2, sealing the other air-suction ports 202, marking and sealing the air-suction pipes 201 connected with the air-suction ports 202, during detection, not connecting the air-suction pipes 201 with the air inlets 104, at the same time, mounting the waterproof devices 3 beside used air-suction ports 202 for detection, rapidly placing the detection pipe 2 with the waterproof device 3 mounted in each gas extraction borehole 7 from the first interface of the three-way pipe 4, mounting the sealing element 5 at the connecting part between the first interface of the three-way pipe 4 and the detection pipe 2, at this time, the gas extraction boreholes 7 are in a normal extraction status, sequentially connecting another ends of the air-suction pipes 201 for detection to the air inlets 104 of the detection host 1, and after connection is finished, using the underground wind pipe 11 for connecting the detection host 1 and the underground compressed air tube 12 to provide power for the negative pressure injector in the detection host 1.

Step 4, after assembly is finished, starting the control switch 102 to perform pretest experiment on the sealing quality detection device for gas extraction boreholes, and under normal circumstances, and under an action of the negative pressure injector, simultaneously working all the air-suction ports 202 and the exhaust ports 103 on the detection host 1.

Step 5, after the experiment is finished, switching the control switch 102 off, connecting each exhaust port 103 in the detection host 1 with a rubber bladder (mot shown) for collecting gas, then starting the control switch 102, enabling gas in the gas extraction boreholes 7 to enter each air-suction pipe 201 in the detection pipe 2 at the same time through the air-suction ports 202 in the detection pipe 2, and then finally to enter the rubber bladders through the exhaust ports 103 corresponding to the air inlets 104 in the detection host 1, after the quantitative gas to be detected is collected in the rubber bladders, switching the control switch 102 off, then, using an underground gas detection equipment (an optical gas detector, not shown) for determining a gas concentration in the rubber bladders, or bringing the rubber bladders to a ground to determine the gas concentration by a chromatographic instrument and other devices (not shown), so as to obtain gas concentrations $ND_1, ND_2, \ldots, ND_n$ at detection points.

Step 6, repeating Step 5 to cycle until the sealing quality of all gas extraction boreholes 7 has been determined.

Step 7, evaluating the sealing quality of each gas extraction borehole 7 by using a total air leakage rate K of a single gas extraction borehole according to the following steps:

According to the extraction gas mixing quantity Q in the gas extraction boreholes 7 obtained from Step 2 and the $ND_1, ND_2, \ldots, ND_n$ obtained from Step 5, and based on the a principle that pure gas contents are the same in all places of each gas extraction borehole 7, then the pure gas contents CL in all parts of each gas extraction boreholes 7 are $Q \times ND_n$, the extraction gas mixing quantity Qi at each detection point for gas extraction is: $Q_i = CL/ND_i$ (i=1, 2, ..., n), then a total air leakage quantity of the gas extraction boreholes is $Q_L = Q - Q_1 = Q_n - Q_1$ (a distance between a detection hole position for detecting the extraction gas mixing quantity Q and the $n_{th}$ detection point $JC_n$ position at the hole is small, and the gas detected by both is located in the same section of the extraction pipe 9. Therefore, the extraction gas mixing quantity Q can be regarded as the extraction gas mixing quantity $Q_n$ at the $JC_n$ detection point, i.e. $Q = Q_n$) of the gas extraction boreholes, and a total air leakage rate of the gas extraction boreholes is $$K = \frac{Q_n - Q_1}{Q} \times 100\%$$

or $$K = \frac{Q - Q_1}{Q} \times 100\%.$$

A manner that six detection points are arranged in sequence within the gas extraction boreholes 7 is taken as the example ($JC_1$ being the detection point at the deepest and $JC_6$ being the detection point at the hole of the gas extraction boreholes 7), six air-suction ports 202 are used on the detection pipe 2, and detection values of the gas concentration and extraction gas mixing quantity Q at the detection points are shown as Table 3.

TABLE 3

Detection Values of Gas Concentration and Extraction Gas Mixing Quantity Q at detection Points

| Name of detection points | $JC_1$ | $JC_2$ | $JC_3$ | $JC_4$ | $JC_5$ | $JC_6$ |
|---|---|---|---|---|---|---|
| Gas concentration % | 80 | 80 | 80 | 80 | 60 | 60 |
| Extraction gas mixing quantity Q (m³/min) | | | | 1.2 | | |

According to the principle that the pure gas contents are the same in all parts of the gas extraction boreholes 7, the pure gas contents CL in all parts of gas extraction boreholes 7 are $Q \times ND_n$, then $CL = Q \times ND_6 = 1.2 \times 60\% = 0.72$ m³/min; and based on this, the extraction gas mixing quantity $Q_i$ at each detection point can be calculated, $Q_i = CL/ND_i$ (i=1, 2, ..., n) as shown in Table 4.

TABLE 4

Extraction Gas Mixing Quantity $Q_i$ at detection Points

| Name of detection points | $JC_1$ | $JC_2$ | $JC_3$ | $JC_4$ | $JC_5$ | $JC_6$ |
|---|---|---|---|---|---|---|
| Extraction gas mixing quantity $Q_i$ at detection (m3/min) points | 0.9 | 0.9 | 0.9 | 0.9 | 1.2 | 1.2 |

Then, a total air leakage quantity $Q_L$ of the gas extraction boreholes 7 is equal to the extraction gas mixing quantity at the detection point 6 ($JC_6$) minus the extraction gas mixing quantity at the detection point 1 ($JC_1$), that is, $Q_L = Q_6 - Q_1 = 1.2 - 0.9 = 0.3$ m³/min; and further, a total air leakage rate K of the gas extraction boreholes is:

$$K = \frac{Q_6 - Q_1}{Q} \times 100\% = \frac{0.3}{1.2} \times 100\% = 25\%.$$

According to the total air leakage rate K of the gas extraction boreholes, a sealing quantity level of the gas extraction boreholes 7 is classified, corresponding treatment suggestions are proposed, and the sealing quality level and recommended treatment measures are shown as Table 1.

TABLE 1

Sealing quality level and recommended treatment measures

| Total air leakage rate K(%) of gas extraction boreholes | Sealing quality level | Recommended treatment measures |
|---|---|---|
| 0 | Tight sealing | Normal use |
| 0-10 | Minor air leakage | Control negative pressure |
| 10-50 | Excessive air leakage | Secondary sealing |
| ≥50 | Severe air leakage | Removal and isolation |

According to Table 1, the total air leakage rate K of the gas extraction boreholes is 25%, and the sealing quality level of the gas extraction boreholes belongs to excessive air leakage. To ensure the overall extraction effect of all the gas extraction boreholes 7 in the working area, it is recommended to carry out secondary sealing.

Step 7 further comprises the following steps: evaluating the sealing quality of different borehole groups, wherein when each borehole group consists of a plurality of gas extraction boreholes 7, the sealing quality is evaluated by a proportion λ of the air leakage gas extraction boreholes and an average air leakage rate η of the borehole group.

The proportion λ of the air leakage gas extraction boreholes is a ratio of a number m of air leakage gas extraction boreholes 7 to a total number N of entire evaluated gas extraction boreholes, $$\lambda = \frac{m}{N} \times 100\%.$$

The average air leakage rate/is a ratio of a sum of a total air leakage rate K of air leakage gas extraction boreholes 7 in entire evaluated gas extraction boreholes to a number m of air leakage gas extraction boreholes 7, $$\eta = \frac{\sum_{i=1}^{m} K_i}{m}.$$

The sealing quality evaluation of the borehole groups is implemented by the proportion λ of the air leakage gas extraction boreholes and the average air leakage rate η of each borehole group based on the evaluation of a single gas extraction borehole, and the sealing quality of the borehole groups is often used to compare the sealing quality between different sealing methods.

In the embodiments, it is assumed that there are two borehole groups (each borehole group has five gas extraction boreholes 7, for the sealing method for each gas extraction borehole 7 in the first borehole group, polyurethane is used, and for the sealing method for each gas extraction borehole 7 in the second borehole group, cement mortar is used), the sealing quality detection device for gas extraction boreholes of the present invention is used to evaluate the sealing quality of each gas extraction borehole 7 in each borehole group, and the total air leakage rate K of each gas extraction borehole in the two borehole groups is shown as Table 5.

TABLE 5

The total air leakage rate K of the gas extraction boreholes in two borehole groups

| | | | | | |
|---|---|---|---|---|---|
| Number of gas extraction boreholes 7 of the first borehole groups | 1 | 2 | 3 | 4 | 5 |
| Total air leakage rate K(%) of each gas extraction borehole | 15 | 0 | 0 | 20 | 0 |
| Number of gas extraction boreholes 7 of the second borehole group | 1 | 2 | 3 | 4 | 5 |
| Total air leakage rate K(%) of each gas extraction borehole | 0 | 0 | 8 | 0 | 0 |

According to the data in the table and the proportion λ of air leakage gas extraction boreholes and the average air leakage rate η, calculation is performed according to the calculation formula.

The proportion of the air leakage gas extraction boreholes in the first borehole group is $$\lambda = \frac{m}{N} \times 100\% = \frac{2}{5} \times 100\% = 40\%;$$

the average air leakage rate of the first borehole group is $$\eta = \frac{\sum_{i=1}^{m} K_i}{m} = \frac{15\% + 20\%}{2} = 17.5\%.$$

The proportion of the air leakage gas extraction boreholes in the second borehole group is $$\lambda = \frac{m}{N} \times 100\% = \frac{1}{5} \times 100\% = 20\%;$$

the average air leakage rate of the second borehole group is $$\eta = \frac{\sum_{i=1}^{m} K_i}{m} = \frac{8\%}{1} = 8\%.$$

By comparing the proportion λ of air leakage gas extraction boreholes and the average air leakage rate η in the two borehole groups, it can be seen that the proportion λ of air leakage gas extraction boreholes and the average air leakage rate η of the second borehole group are both smaller than those of the air leakage gas extraction boreholes in the first borehole group, that is to say, the sealing quality of the gas extraction boreholes in the second borehole group using a cement mortar sealing method is significantly higher than that of the gas extraction boreholes in the first borehole group using a polyurethane sealing method.

Although embodiments of the present invention have been shown and described, it can be understood by ordinary technical personnel in the art that multiple changes, modifications, substitutions, and variations can be made to these embodiments without departing from the principles and spirit of the present invention. The scope of the present invention is limited by the accompanying claims and their equivalents.

What is claimed is:

1. A sealing quality evaluating method for gas extraction boreholes, adopting a sealing quality detection device for gas extraction boreholes, the sealing quality detection device comprising a detection host, a detection pipe, a sealing element, and a three-way pipe;

wherein a plurality of air inlets and a plurality of exhaust ports are formed above the detection host, a negative pressure injector is arranged in the detection host, a quick joint and a control switch are also arranged on the detection host, the quick joint is used to be connected with an underground wind pipe, the underground wind pipe is connected to an underground compressed air tube, and the control switch is used for starting and switching off the negative pressure injector in the detection host;

wherein a second interface of the three-way pipe is connected with an extraction pipe, the extraction pipe is arranged in each gas extraction borehole, a third interface of the three-way pipe is connected with an extraction tube, one end of the detection pipe is connected with the air inlets of the detection host, another end of the detection pipe penetrates through the three-way pipe from a first interface of the three-way pipe and penetrates out of the second interface of the three-way pipe to be arranged in the extraction pipe and a corresponding gas extraction borehole, and the sealing element is arranged at a connection part between the detection pipe and the first interface of the three-way pipe, and is used for sealing a gap between the detection pipe and the first interface of the three-way pipe; and wherein the detection pipe comprises a hollow pipe body, a plurality of air-suction ports, a support frame and a plurality of air-suction pipes, wherein the plurality of air-suction ports which are formed in a spacing manner are formed in the hollow pipe body, the support frame is arranged in the hollow pipe body, a plurality of through holes allowing the air-suction pipes to penetrate through are formed in the support frame, each through hole can allow one air-suction pipe to penetrate through, one ends of the plurality of the air-suction pipes penetrate through the through holes in the support frame to be in one-to-one connection with the air-suction ports in the hollow pipe body, one section of another end of each air-suction pipe is placed outside the hollow pipe body, and while in use, the air-suction pipes are in one-to-one connection with the air inlets in the detection host;

the method comprising the following steps:

step 1, investigating a depth $L_1$ of an actual sealing section of each gas extraction borehole, a sealing method, and a total length $L_2$ of the extraction pipe used in each gas extraction borehole, detecting front and rear parts of connection parts between the extraction pipes, an inner part of a width of a loose circle in a roadway, and other positions where air leakage may occur so as to determine a quantity and positions of detection points to be detected, and recording the detection points along a gas flow direction as $JC_1, JC_2, \ldots, JC_n$;

step 2, detecting an extraction gas mixing quantity Q in the gas extraction boreholes that need to be detected by using a gas flow detection device;

step 3, assembling the sealing quality detection device for gas extraction boreholes: firstly, connecting the second interface and the third interface of the three-way pipe with the extraction pipes and the extraction tube respectively, then according to the quantity and the positions of the detection points determined in Step 1, reserving the air-suction ports for detection of corresponding positions and quantities on the hollow pipe body of the detection pipe, sealing the other air-suction ports, marking and sealing the air-suction pipes connected with the air-suction ports, during detection, not connecting the air-suction pipes with the air inlets, at the same time, mounting waterproof devices are beside used air-suction ports for detection, rapidly placing the detection pipe with the waterproof device mounted in each gas extraction borehole from the first interface of the three-way pipe, mounting the sealing element at the connecting part between the first interface of the three-way pipe and the detection pipe, at this time, the gas extraction boreholes are in a normal extraction status, sequentially connecting another ends of the air-suction pipes for detection to the air inlets of the detection host, and after connection is finished, using the underground wind pipe for connecting the detection host and the underground compressed air tube to provide power for the negative pressure injector in the detection host;

step 4, after assembly is finished, starting the control switch to perform pretest experiment on the sealing quality detection device for gas extraction boreholes, and under normal circumstances, and under an action of the negative pressure injector, simultaneously working all the air-suction ports and the exhaust ports on the detection host;

step 5, after the experiment is finished, switching the control switch off, connecting each exhaust port in the detection host with a rubber bladder for collecting gas, then starting the control switch, enabling gas in the gas extraction boreholes to enter each air-suction pipe in the detection pipe at the same time through the air-suction ports in the detection pipe, and then finally to enter the rubber bladders through the exhaust ports corresponding to the air inlets in the detection host, after the pre-detected gas is collected in the rubber bladders, switching the control switch off, then, using an underground gas detection equipment for determining a gas concentration in the rubber bladders, or bringing the rubber bladders to a ground to determine the gas concentration by a chromatographic instrument, so as to obtain gas concentrations $ND_1, ND_2, \ldots, ND_n$ at detection points;

step 6, repeating step 5 to cycle until a sealing quality of all the gas extraction boreholes has been determined; and step 7, evaluating the sealing quality of each gas extraction borehole by using a total air leakage rate K of a single gas extraction borehole:

wherein step 7 further comprises the following steps for evaluating the sealing quality of each gas extraction borehole:

according to the extraction gas mixing quantity Q in the gas extraction boreholes obtained from step 2 and the $ND_1, ND_2, \ldots, ND_n$ obtained from Step 5, based on a principle that pure gas contents are the same in all parts of each gas extraction borehole, the pure gas contents CL in all parts of each gas extraction borehole are $Q \times ND_n$, based on $Q_i = CL/ND_i (i=1, 2, \ldots, n)$, an extraction gas mixing quantity $Q_i$ at each detection point is calculated, a total air leakage quantity of the gas extraction boreholes is $Q_L = Q-1 = Q_n - Q_1$, and a total air leakage rate of the gas extraction boreholes is $$K = \frac{Q_n - Q_1}{Q} \times 100\%$$

or $$K = \frac{Q_n - Q_1}{Q} \times 100\%;$$

and wherein step 7 further comprises the following steps:

evaluating the sealing quality of different borehole groups: when each borehole group consists of a plurality of gas extraction boreholes, the sealing quality is evaluated by a proportion $\lambda$ of air leakage gas extraction boreholes and an average air leakage rate rU of the borehole group:

wherein the proportion $\lambda$ of air leakage gas extraction boreholes is a ratio of a number m of air leakage gas extraction boreholes to a total number N of entire evaluated gas extraction boreholes, $$\lambda = \frac{m}{N} \times 100\%;$$

and wherein the average air leakage rate η is a ratio of a sum of a total air leakage rate K of air leakage gas extraction boreholes in entire evaluated gas extraction boreholes to a number m of air leakage gas extraction boreholes, $$\eta = \frac{\sum_{i=1}^{m} K_i}{m}.$$

2. The method of claim 1, wherein twelve air-suction ports are formed, and twelve air-suction pipes are arranged.

3. The method of claim 1, wherein the hollow pipe body and the support frame are made of a polyethylene-aluminum material, and the air-suction pipes are made of a flame-retardant PE material.

4. The method of claim 1, wherein a plurality of waterproof devices are mounted on the detection pipe, are sleeved on the hollow pipe body and are placed behind each air-suction port.

5. The method of claim 4, wherein each waterproof device comprises a sleeve body, a first screw nut and a second screw nut, wherein the sleeve body comprises a first hollow cylindrical section, while a second hollow cylindrical section and a third hollow cylindrical section are respectively arranged at two ends of the first hollow cylindrical section, a first external thread and a first square gear are arranged on an outer circumference of the second hollow cylindrical section, a second external thread and a second square gear are arranged on an outer circumference of the third hollow cylindrical section, the sleeve body sleeves outside the hollow pipe body, the first screw nut and the second screw nut are respectively mounted on the second hollow cylindrical section and the third hollow cylindrical section, and the first screw nut and the second screw nut are respectively and tightly screwed at the first external thread and the second external thread to fix the sleeve body to an outer part of the hollow pipe body.

6. The method of claim 1, wherein step 8 is performed after step 7, and step 8 comprises the following steps:
according to a total air leakage rate K of the gas extraction boreholes, a sealing quality level of the gas extraction boreholes is classified, corresponding treatment suggestions are proposed, and the sealing quality level and recommended treatment measures are shown as Table 1:

TABLE 1

Sealing quality level and recommended treatment measures

| Total air leakage rate K(%) of gas extraction boreholes | Sealing quality level | Recommended treatment measures |
|---|---|---|
| 0 | Tight sealing | Normal use |
| 0-10 | Minor air leakage | Control negative pressure |
| 10-50 | Excessive air leakage | Secondary sealing |
| ≥50 | Severe air leakage | Removal and isolation. |

* * * * *